United States Patent [19]
Ellis et al.

[11] Patent Number: 5,388,263
[45] Date of Patent: Feb. 7, 1995

[54] PROCEDURE STATE DESCRIPTOR SYSTEM FOR DIGITAL DATA PROCESSORS

[75] Inventors: John R. Ellis, Woodside, Calif.; Charles G. Nylander, Nashua, N.H.; R. Kim Peterson, Seattle, Wash.

[73] Assignee: Digital Equipment Corporation, Maynard, Mass.

[21] Appl. No.: 923,022

[22] Filed: Jul. 30, 1992

Related U.S. Application Data

[63] Continuation of Ser. No. 406,452, Sep. 13, 1989, abandoned.

[51] Int. Cl.[6] .......................... G06F 3/00; G06F 9/22
[52] U.S. Cl. ............................ 395/650; 364/264.6; 364/281.3; 364/DIG. 1
[58] Field of Search ............................... 395/650, 700

[56] References Cited

U.S. PATENT DOCUMENTS 4,493,027  1/1985  Katz et al. ........................ 364/200
4,649,472  3/1987  Kim .................................. 364/200

OTHER PUBLICATIONS

Helvig et al., "IBM Technical Disclosure Bulletin-Exception Condition Sequencer," pp. 1627–1634.

*Primary Examiner*—Kevin A. Kriess
*Assistant Examiner*—John Q. Chavis
*Attorney, Agent, or Firm*—Christensen, O'Connor, Johnson & Kindness

[57] ABSTRACT

A procedure state descriptor system for generating state reports of the progress of the invocation process for procedures executed on a digital data processing system is disclosed. The procedure state descriptor system includes a procedure descriptor generator process that generates a procedure descriptor for each procedure. Each procedure descriptor contains a number of offset values that are offset addresses from the start of the procedure to locations in the procedure that are the demarcations between states of the invocation process for the procedure. When a particular procedure is invoked for execution, a procedure state analyzation process accesses the procedure descriptor offset values for the procedure, the memory address of the start of the procedure, and the address of the next instruction to be executed in the procedure. The procedure state analyzation process then determines the difference between the address of the instruction to be next executed and the starting address of the procedure. The difference between the two addresses is compared to the offset values to determine the state of the invocation process for the procedure. As the result of selected state determinations, the procedure state analyzation process also may review the next instruction to be executed by the invoked procedure. The instruction is reviewed to determine if it is a specific type of instruction indicating that the procedure was in still another invocation state.

20 Claims, 4 Drawing Sheets

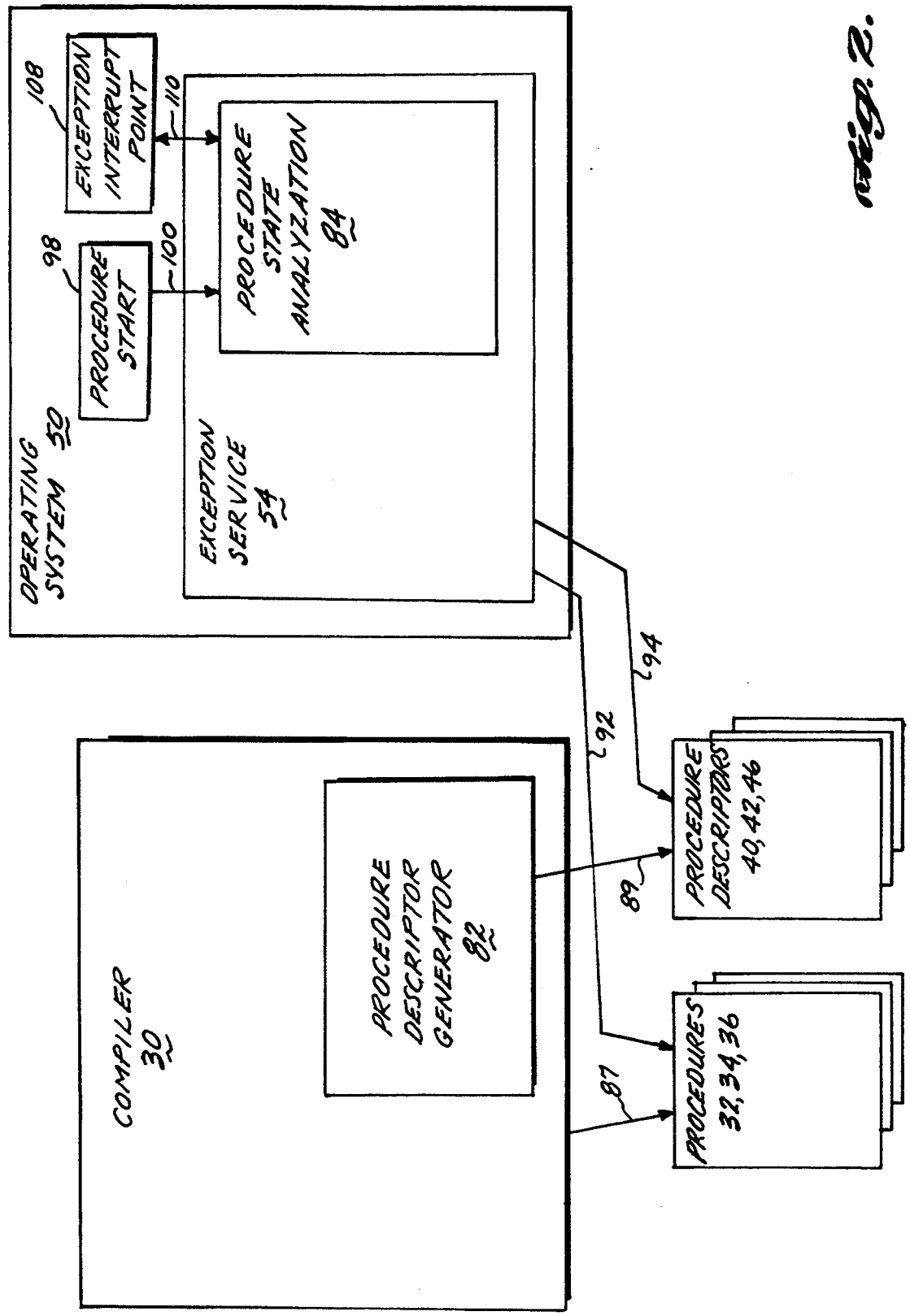

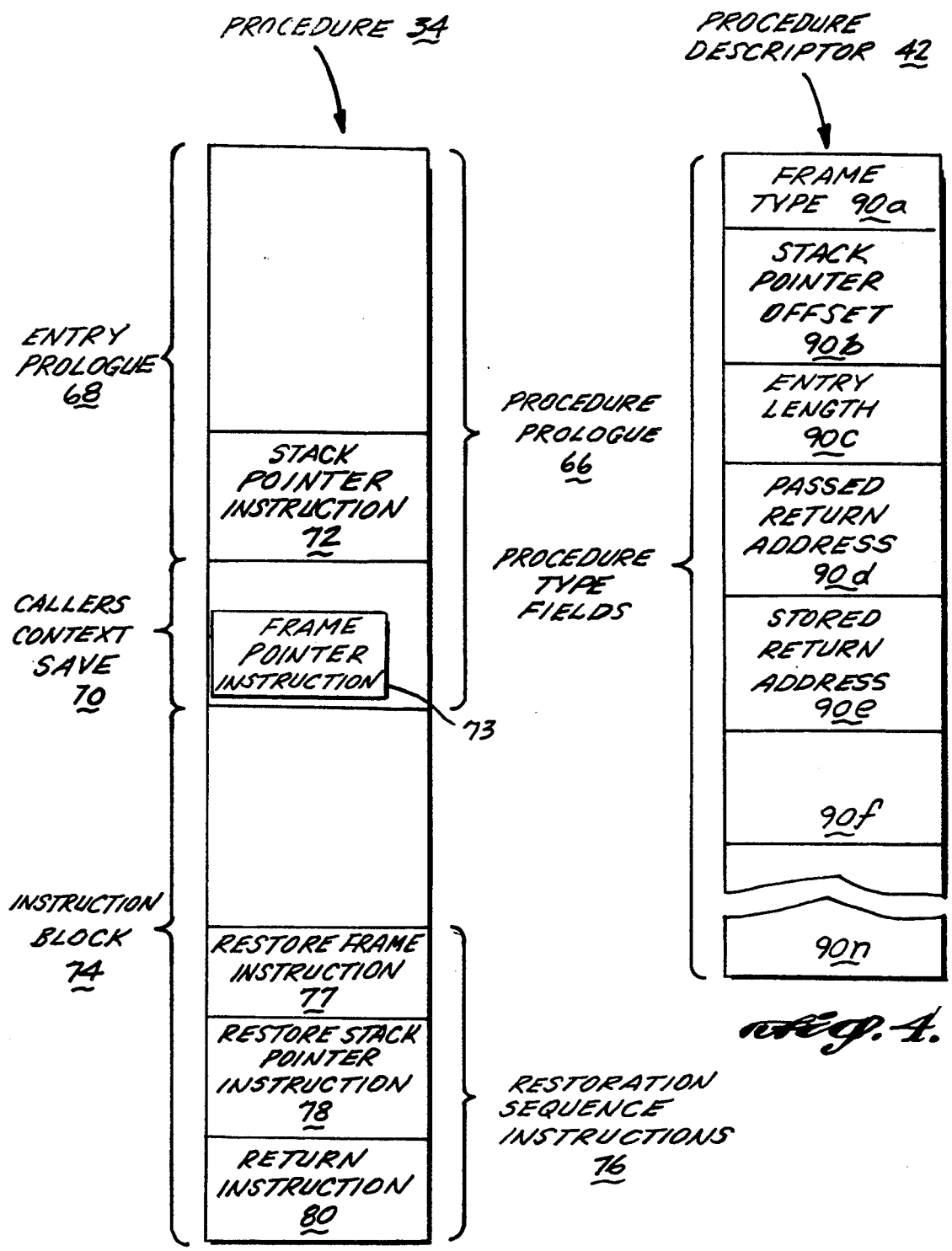

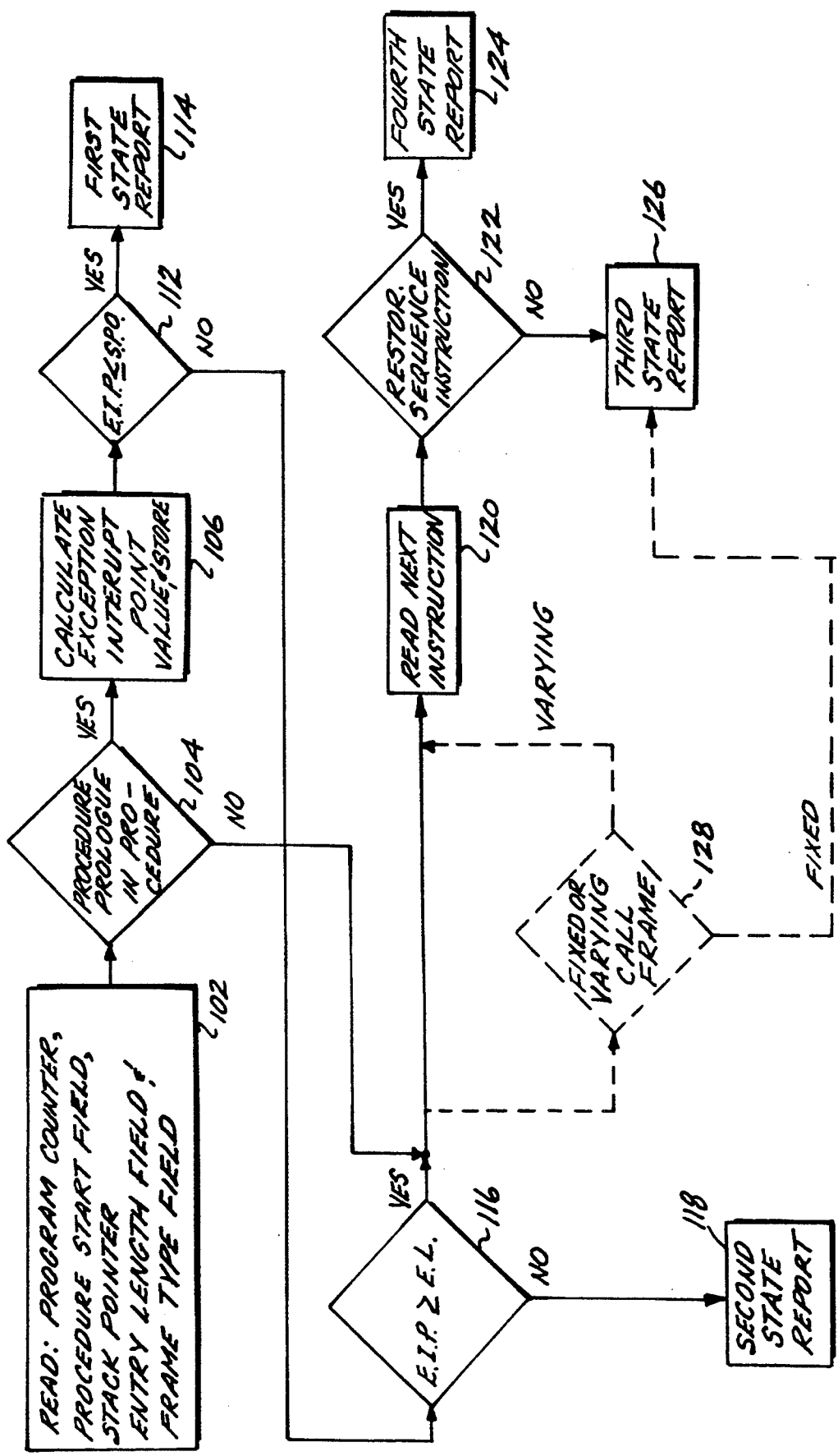

PROCEDURE STATE DESCRIPTOR SYSTEM FOR DIGITAL DATA PROCESSORS

This application is a continuation application based on prior copending application Ser. No. 07/406,452, filed on Sep. 13, 1989, now abandoned.

FIELD OF THE INVENTION

This invention relates generally to the field of digital data processing systems, and, more specifically, to a system for providing an indication of the exact execution state of a procedure being executed by a digital data processing system.

BACKGROUND OF THE INVENTION

A digital data processing system basically comprises three components, a central processing unit, a memory, and an input-output unit. The central processing unit manipulates data supplied thereto in accordance with a set of instructions contained in a program, often called an application process. The memory is used to store the data, the program instructions, intermediate data and system status information required to operate the system, and the final output resulting from the manipulation of the data. Each element of information, the instructions, the data and status information is stored in a specific designated address of the memory. The input-output unit provides a means for entering the data and program instructions into the system and for receiving output status messages and the final output of data manipulations therefrom. When the digital data processing system is in operation, the central processing unit operates by retrieving, or fetching, information from the memory, determining if the information is instructions or data, manipulating the fetched data in accordance with the instructions, and storing the results of the data manipulations in the memory.

Any program run on a digital data processing system is typically made up of a number of smaller entities, referred to as procedures, each of which is designed to accomplish a specific task and consists of a set of central processing unit executable instructions. Some procedures are based on higher-level instructions contained in user supplied source code. For example, a user-drafted instruction to add two numbers together may be translated into a central processing unit executable procedure that includes instructions to: retrieve the numbers from selected memory address locations; add the numbers together; and store the sum of numbers in a memory address location. Still other central processing unit executable procedures perform housekeeping functions for the digital data processing system. For example, some procedures load data instructions from an input-output device into memory locations and other procedures supply input-output devices with information stored in memory locations. The housekeeping procedures are typically part of an operating system which emptiness a set of processes designed to control execution of the application process by the digital data processing system.

Typically, a procedure running on the digital data processing system has the capability of invoking or calling another procedure for execution on the system. A call to another procedure may occur during the execution of a procedure in order to initiate the execution of another procedure that is part of the process being run. Further, a procedure being executed may call another procedure for execution if the calling procedure requires a particular subtask to be performed that the called procedure is designed to perform. Thus, the actual running of a process on a digital data processing system can be viewed as the selective, and sometimes repetitive, execution of a number of individual procedures by the system.

When a digital data processing system is in operation, events may occur that the procedure currently running on the system may not be designed to resolve. These events, referred to as exceptions, may be either internal or external to the process running on the system. Examples of external exceptions include the failure of input-output devices, or a system user entering a command to intentionally stop the running of the process. Internal exceptions occur as a result of the execution of a particular instruction that disrupts the execution of the procedure being executed. An example of an internal exception is an instruction in a procedure to divide a number by zero.

The operating systems of many data processing systems are provided with exception services which are processes designed to resolve exceptions that can occur during the operation of digital data processing systems. An exception service comprises a number of procedures, which respond to exceptions by invoking other procedures for execution, known as exception handlers, that are designed to resolve the exceptions. Depending on the particulars of the procedures being executed when an exception occurs, and the nature of the specific exception, the exception service may invoke an exception handler or set of exception handlers which: attempts to cure the exception; ignores the exception; "unwinds" the current process running on the system by returning to a suspended procedure, which either directly or indirectly called the interrupted procedure, where the exception can be resolved; or, may undertake a combination of these actions.

Problems arise in digital data processing systems when exceptions occur while one procedure is invoking another procedure for execution. In some digital data processing systems there is a period during the procedure invocation process wherein the exception service is unable to accurately establish whether an exception occurred during the running of the calling procedure or during the running of the called procedure. Consequently, the exception service may fail to invoke a correct exception handler. This can occur if the exception service either invokes an incorrect exception handler or invokes the correct exception handler with incorrect information. Moreover, if the exception service cannot promptly determine the specific procedure being executed when the exception occurred, the exception service may be unable to properly save data and instructions relating to the procedure being executed.

SUMMARY OF THE INVENTION

This invention provides a new and useful system for and method of detecting the execution state of a data processing system. A primary feature of the invention is the capability of determining the execution state of a procedure that is in the process of being invoked or called for execution on the system. For example, the procedure state descriptor system is able to provide a state report indicating that a called procedure is: in an initial, or preparatory, state of invocation; being executed by the system; or, is in a return, or restoration, state wherein the called procedure has been executed and is in the process of returning control of the system to the calling procedure. The procedure state descriptor system thus provides an exception service with an indication of the invocation state of the procedure being executed by the system at any time so that the exception service can in turn invoke an appropriate handler.

The procedure state descriptor system of this invention relies on two complementary processes to produce procedure state reports when exceptions occur. The first process is a procedure descriptor generation process, which preferably is part of a compilation process, and which produces procedure descriptors for each of the procedures that are executed by the system. Included in each procedure descriptor are offset values that are representative of specific points of execution of the procedures. These specific points of execution define the boundaries between different states of execution of the procedure.

The second process is a procedure state analyzation process that is run as part of the exception service. Whenever an exception occurs, the procedure state analyzation process compares the procedure descriptor offset values for the procedure descriptor for the procedure that was being executed when the exception occurred with state information from the central processing unit to determine the extent to which the central processing unit has executed the procedure. More specifically, the procedure state analyzation process compares the address, or value, of the next instruction to be executed with the procedure descriptor offset values to determine which instructions have been executed. The indication of whether the particular instruction represented by an offset value has been executed is an indication of the state of execution of the procedure. Thus, the procedure state analyzation process determines whether execution of the procedure has gone beyond the boundaries between different states of execution, and therefore the invocation state of the procedure.

The procedure state analyzation process also reviews the next procedure instruction to be executed by the central processing unit. If the next instruction is a certain type of instruction, the procedure state analyzation process may make still another procedure invocation state determination. For example, if the next procedure instruction to be executed is a restoration sequence instruction for restoring the called procedure, the procedure state analyzation process may make a determination that the procedure being executed was in the restoration state when the exception occurred. Depending on the invocation state of the procedure, the procedure state analyzation process then generates an appropriate state report message to the exception service.

The procedure state descriptor system provides a prompt indication of the state of execution of a procedure being executed by the digital data processing system whenever an exception occurs. The procedure state descriptor system thus provides the exception service with an indication of the extent to which a called procedure has been invoked. Using that indication the exception service can take the appropriate responsive action. This increases the overall speed of the digital data processing system in response to exceptions, since there is no delay waiting for a procedure running on the system to be completely invoked before exceptions occurring during the invocation process can be resolved. The speed of the system is also increased in the execution of procedures since the need to provide extra instructions or hardware support to disable and reenable exceptions during calling and restoring procedures is eliminated. Moreover, the invention essentially eliminates the possibility that delayed exception processing will cause a loss of process instructions or data that could cause malfunction of the digital data processing system.

BRIEF DESCRIPTION OF THE DRAWINGS

This invention is pointed out with particularity in the appended claims. The above and further advantages of this invention may be better understood by reference to the following description taken in conjunction with the accompanying drawings in which:

FIG. 2 diagrammatically depicts as separate modules the procedure state descriptor processes of this invention;

FIG. 3 depicts the format of a procedure loaded into the memory of a digital data processing system of this invention for execution by the system;

FIG. 4 depicts the format of a procedure descriptor constructed according to this invention; and FIG. 5 is a sequence diagram or flow chart that illustrates a sequence that can be utilized in accordance with this invention to perform a state analysis on a procedure being executed by the digital data processing system.

DETAILED DESCRIPTION OF THE PREFERRED EMBODIMENT

Figure 1:
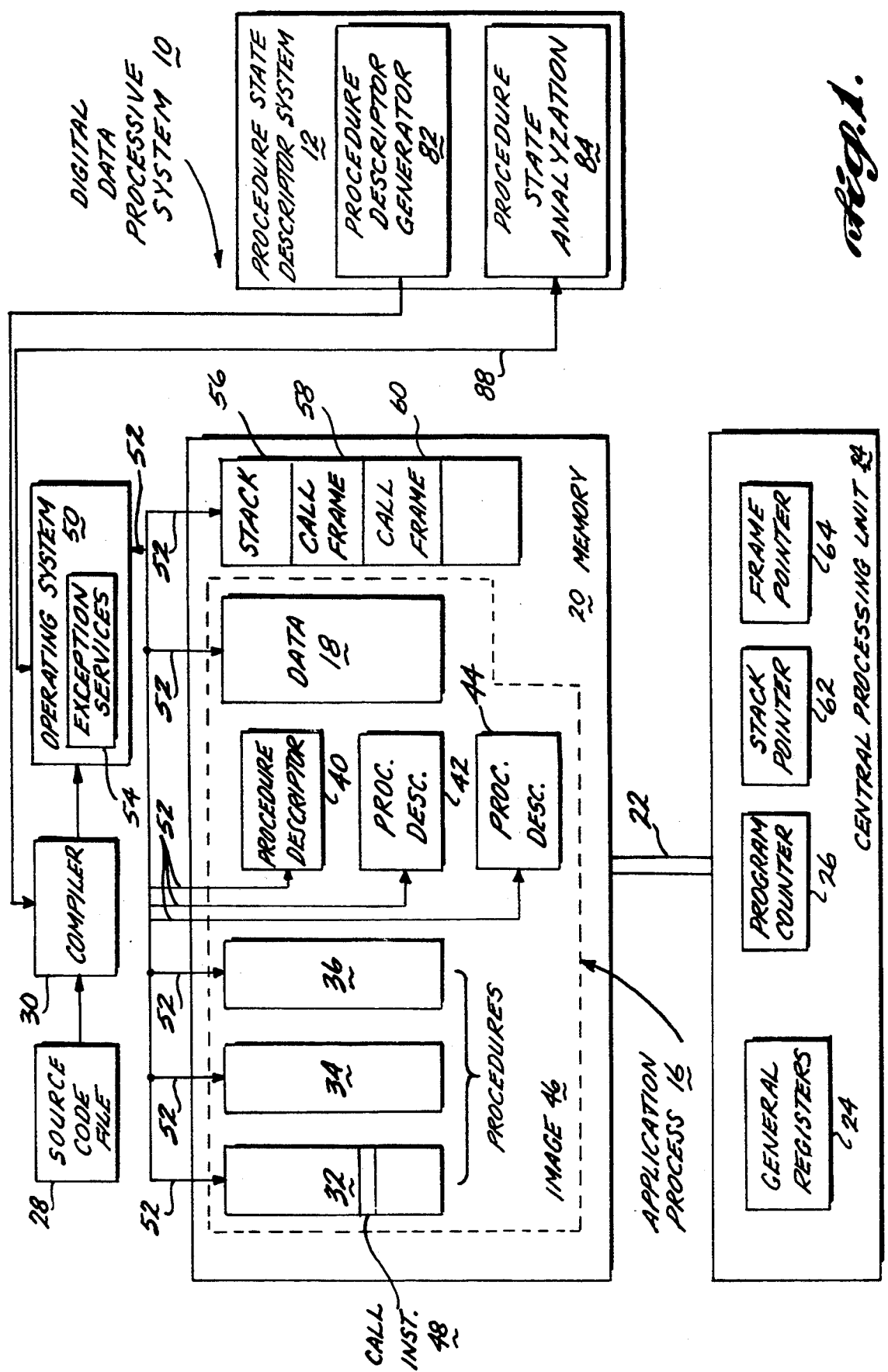
FIG. 1 depicts, in block diagram form, a digital data processing system that is configured and arranged to incorporate a procedure state descriptor system that is in accordance with this invention.

FIG. 1 diagrammatically depicts a portion of a digital data processing system 10 wherein the processes that comprise a procedure state descriptor system 12 constructed in accordance with this invention are run. The digital data processing system 10 includes a central processing unit 14 on which an application process 16, comprising a set of central processing unit-executable instructions and data 18 to be executed in accordance therewith, is run. A memory unit 20 is provided for temporarily and permanently storing the process instructions and data 18, and the intermediate and final output resulting from the running of the process 16. Each instruction and item of data 18 in the memory 20 is written into, and subsequently read from a specific, individual, memory address location. Not illustrated in FIG. 1 is an input-output unit designed to load instructions and data into the digital data processing system 10 and to receive status reports and output results therefrom. An address and data bus 22 provides the necessary communications link between the central processing unit 14, the memory unit 20 and the input-output unit attached thereto.

When the digital data processing system 10 is in operation, the central processing unit 14 accesses, or fetches, information from the memory 20, determines if the information is an instruction or data 18, and selectively manipulates the data 18 in accordance with the instructions. In the depicted arrangement, the central processing unit 14 includes a set of general registers 24 that serve as temporary storage locations for information about to be, or just, processed by the central processing unit 14. The central processing unit 14 also includes a temporary storage register referred to as a program counter 26 that contains the memory address of the next central processing unit-executable instruction to be fetched. In some central processing units 14, program counter 26 may be a selected general register 24.

The instruction portion of the application process 16 is initially in the form of a user drafted source code file 28. At the source code level, the instructions are in the form of a high-level computer language such as FORTRAN, PASCAL or the like. Prior to loading and execution of the process 16, the system converts the source code file 28 into sets of instructions that can be executed by central processing unit 14. In FIG. 1, this conversion of the source code file 28 is effected by a complier 30. The sets of instructions are loaded into the memory 20 and are identified in FIG. 1 as procedures 32, 34 and 36, each of which is designed to accomplish a specific task.

As will be described in more detail hereinafter, the compiler 30 supports and contributes to the invention by generating a procedure descriptor 40, 42 and 44 for each of the procedures 32, 34 and 36. Specifically, in the arrangement shown in FIG. 1: procedure descriptor 40 describes attributes of procedure 32; procedure descriptor 42 describes attributes of procedure 34; and procedure descriptor 44 describes attributes of procedure 36. As also is indicated in FIG. 1, the procedures 32, 34 and 36, the procedure descriptors 40, 42 and 44 and the data 18 to be manipulated in accordance with the procedures form an image 46, which is the entity processed by central processing unit 14.

As indicated by a call instruction 48 in procedure 32, at any point in a procedure, the central processing unit 14 can be directed to invoke and begin execution of another procedure, for example procedure 34. A procedure 32 calls, or invokes, another procedure 34 for execution when the calling procedure 32 requires computations or data processing that the called procedure 34 is designed to perform. A call instruction 48 may appear in the middle or at the end of any given procedure 32, 34 or 36. One procedure 32, 34 or 36 may call one or more other procedures, call the same procedure more than one time, and may, in some circumstances call itself through a recursive process.

Shown in FIG. 1 is an operating system 50, which is a set of services that control the running of the image 46 on the digital data processing system 10. As is indicated by lines 52, the functions provided by the operating system 50 include: loading the procedures 32, 34 and 36 and the procedure descriptors 40, 42 and 44 into the memory 20; loading the data 18 from an input device into the memory 20; and, reading information from the system 10 to an output device.

The operating system 50 also includes an exception service 54, which is a process for responding to exceptions that occur during the operation of the digital data processing system 10. An exception is an event that the procedure being executed is not designed to resolve and such an event may be related or unrelated to the running of the application process 16. An exception unrelated to the application process 16 may be the failure of an input-output device. Examples of exceptions related to the running of the application process 16 can be an instruction to divide by zero, or encountering an incorrect memory address when the procedure instructs the central processing unit 14 to access either data 18 or another procedure 32, 34 or 36.

As is known in the art, an exception service such as exception service 54 responds to an exception by saving the current procedure being executed by the system 10 and by invoking an appropriate exception handler (not shown in FIG. 1) to resolve the exception. As also is known in the art, exception handlers are procedures that are designed to resolve specific exceptions by, for example, directing the central Processing unit 14 to take steps to explicitly cure the exception; instructing the central processing unit 14 to ignore the exception; unwinding the procedure 32, 34 and 36 to a suspended procedure, which either directly or indirectly called the interrupted procedure, where the exception can be resolved; or by undertaking various combinations of these steps.

Also included in the memory 20 of FIGURE 1 is a stack 56 which temporarily stores data that is used during the execution of the procedures 32, 34 or 36. The stack 56 also is used to store information. During execution of a procedure that is called or invoked by another procedure, information relating to both the called procedure and the calling procedure is stored in separate call frames 58 and 60. Each call frame 58 and 60 may be partially stored in the stack 56 as depicted, and in other portions of the system 10 not illustrated. For example, when procedure 34 is being executed by the system 10 in response to the call instruction 48 in procedure 32, call frame 58 will contain information relating to the execution of procedure 32. Call frame 60 would contain information pertaining to the execution of procedure 34.

The call frames 58 and 60 may have a fixed size that is determined during compilation of the source code that resulted in procedures 32, 34, and 36. Alternatively, call frames 58 and 60 may be of a "variable" size that is not determined until the procedures are executed. The central processing unit 14 includes a temporary register identified as a stack pointer 62 that contains the address of the last item placed on the stack 56 during the execution of a procedure 32, 34 or 36 by the system 10. Central processing unit 14 also has a temporary register referred to as a frame pointer 64 that contains the starting address of the last call frame 58 or 60 placed on the stack 56. In some central processing units 14, stack pointer 62 and frame pointer 64 may be specific general registers 24.

When loaded into memory, each procedure 32, 34 and 36 is in a specific format as shown in FIG. 3 for procedure 34. Each instruction or data item, forming the parts of the procedure 34, is stored at a specific address location in the memory 20. Further, the instructions and data items are arranged in the order in which they are sequentially fetched by the central processing unit 14 of FIG. 1. As is indicated in FIG. 3, each procedure 34 may include a procedure prologue 66 which consists of an entry prologue 68 followed by a caller's context save block 70.

The entry prologue 68 is a block of instructions executed when the procedure 34 is first invoked in response to a call instruction 48. Included in the entry prologue 68 is a stack pointer instruction 72. Typically, when a procedure such as procedure 34 is called for execution, space is required for storage of information in stack 56. When the required space is allocated during the invocation of procedure 34, stack pointer instruction 72 causes stack pointer 62 (FIG. 1) to be reset to a value that provides the required stack space for procedure 34.

The caller's context save block 70 is a block of instructions executed after the entry prologue 68. The caller's context save block 70 may, for example, comprise a set of instructions that cause the contents of selected general registers 24 to be saved prior to the execution of instructions in the procedure 34 that will write new values into those registers. At the end of the caller's context save block 70 for procedures having a varying size call frame 58 and 60 is a frame pointer instruction 73. Frame pointer instruction 73 causes frame pointer 64 to be reset to the address of the call frame for the called procedure 34.

Following the procedure prologue 66 is an instruction block 74 that contains the sequence of executable instructions that will cause execution of procedure 34 by the data processing system 10. In procedure 34 of FIG. 3, the last set of instructions is a set of restoration sequence instructions 76 that instruct the central processing unit 14 to return to the execution of the procedure (procedure 32 in the example being considered). In FIG. 3, the depicted restoration sequence instruction 76 includes a restore frame pointer instruction 77 that restores the call frame address of procedure 32 that called procedure 34. Following the restore frame pointer instruction 77 is a restore stack pointer instruction 78 that will cause the stack pointer address of the calling procedure 32 to be loaded into the stack pointer 62. Following the restore stack pointer instruction 78 is a return instruction 80 that will cause the central processing unit to return to the calling procedure 32. In some digital data processing systems 10 the return instruction 80 may implicitly include a restore stack pointer instruction 78. In FIG. 3 a single set of restoration sequence instructions 76 are depicted at the end of the procedure 34. In other procedures 32 or 36 there may be other restoration sequence instructions 76 located throughout the instruction block 74 for the procedure 32 or 36.

During the processing of the image 46 by the system 10, any procedure, such as procedure 32, may require execution of a call instruction 48 that invokes another procedure 34. When an exception occurs, the procedure state analyzation process of this invention (12 in FIG. 1) provides the exception service 54 with an invocation state report of the called procedure which is used by exception service 54 to determine if an exception that occurred during the execution of a called procedure 34 should be processed as occurring during the called procedure 34 or as occurring during the calling procedure 32.

In the currently preferred embodiments of the invention, the determination of which procedure should be associated with an exception is based on four invocation states that a particular procedure 32, 34, or 36 may be in when executed. The four possible invocation states are:

First State; the stack pointer 62 has not been modified, i.e., execution of the entry prologue 68 is not yet complete, Second State; execution of the entry prologue 68 has been completed, but execution of the instruction block 74 has not commenced, Third State; execution of procedure prologue 66 has been completed and the system 10 is ready to, or in the process of, executing the instruction block 74 instructions (execution of the restoration sequence 76 instructions has not begun), and, Fourth State; execution of the instructions included in instruction block 74 has been completed and the system 10 is in the process of returning to execute the calling procedure 32.

The first, second, and fourth procedure invocation states are viewed by the exception service 54 as transitory states in which the called procedure is not being executed (or has already been executed). Thus, exceptions occurring during these states are resolved with reference to the calling procedure 32. When an exception occurs during the third state of the procedure invocation process, the called procedure 34 is actually ready for, or being executed by, the central processing unit 14. Accordingly, the exception service 54 resolves exceptions occurring during the third state of the invocation process with respect to the called procedure 34.

The procedure state descriptor system 12 relies on a procedure descriptor generation process (indicated in FIG. 1) represented by block 82 and a procedure state analyzation process (represented by block 84) to determine the state of execution of the called procedure 34. The procedure descriptor generation process 82 produces the procedure descriptors 40, 42 and 44 for each of the procedures 32, 34 and 36 respectively. When an exception occurs, the procedure state analyzation process 84 uses information in procedure descriptor 40, 42 or 44 along with information from the central processing unit 14 to determine the state of execution of any called procedure 32, 34 or 36.

Although the procedure state descriptor system 12 is illustrated in FIG. 1 in the form of distinct entities, it should be recognized that this is for purpose of illustration and that the invention preferably is practiced as processes that are executed in conjunction with processes that are executed by the data processing system 10 in compiling, loading and executing the process 16. In the current practice of the invention, procedure descriptor generator process 82 is performed during Compilation of the compiler 30. Alternatively, the process of generating the procedure descriptors may be performed by any other process responsible for generating the procedures 32, 34 and 36. For example, the process descriptor generation process 82 may be performed by an assembler, not illustrated, or a run time code generating procedure, not illustrated, that is part of the application process 16. The run time code generating procedure can be used to generate procedures 32, 34 and 36 and stores same in memory 18 or stack 56 for later execution by central processing unit 14. As is indicated by arrow 88 in FIG. 1, the analysis process represented by procedure state analyzation block 84 preferably is performed by the operating system 50 as a portion of the exception service 54.

The operation of a procedure state descriptor system that is in accordance with the invention may be more fully understood by reference to FIG. 2 which, like FIG. 1, depicts the invention as distinct modules. As is indicated by arrow 87, when the compiler 30 generates the central processing unit 14 executable procedures 32, 34 and 36, it also performs the process represented by the procedure descriptor generator 82. As previously noted, this process generates procedure descriptors 40, 42 and 44 for the procedures 32, 34 and 36 (represented by arrow 89 in FIG. 2). FIG. 4 illustrates the arrangement of the descriptor 42 for procedure 34, which is exemplary of each procedure descriptor 40, 42, and 44 of FIGS. 1 and 2. As is shown in FIG. 4 procedure descriptor 42 includes a number of procedure descriptor fields 90a, b, c, ... n, each of which contains information describing some aspect of the associated procedure 32, 34 or 36 respectively.

In the depicted procedure descriptor, the first descriptor field is a procedure type field 90a that contains an indication of whether the call frame that will be generated for the associated procedure (e.g., call frames 58 and 60 in FIG. 1) is of fixed or varying size. Following the procedure type field 90a is a stack pointer offset field 90b that contains the offset location of the stack pointer instruction 72 relative to the starting address of procedure 32, 34 or 36 in memory 20. The next procedure descriptor field is an entry length field 90c that contains the offset value of the address location for the first instruction in the instruction block 74 (relative to the starting address of the procedure 34). The procedure descriptor entry length field 90c may also be set with a flag value (typically 00000000) if no procedure prologue 66 is included in procedure 32. When there is no procedure prologue 66, the procedure descriptor stack pointer offset field 90b also is set to 00000000.

In addition to procedure fields 90a, b, and c, the procedure descriptors 40, 42, and 44 may include additional procedure descriptor fields (fields 90d, f, g ... n in FIG. 4). These additional procedure descriptor fields may be used for other environmental information that is useful in controlling the execution of the procedures 32, 34, and 36. One additional field may be a procedure descriptor passed address field 90d containing the identity of a general register 24 that contains the return address to the called procedure 32. Specifically, the return address is the address of the next instruction after the call instruction 48. A procedure descriptor stored address field 90e may also be included. The stored address field contains the location in the call frame 58 for the procedure 34 that, like the above-identified general register 24, contains the return address to the called procedure 32. Other environmental information may include, for example: a register mask indicating whether specific registers of general registers 24 are to be saved or overwritten; the size of the procedure 38; an identification of the exception handler to be invoked if an exception occurs during the execution of the associated procedure; and, a prologue flag field to indicate whether the procedure is an entry point or nonentry point procedure.

It will be recognized by those skilled in the art that the procedure descriptors 40, 42, and 44 may be readily formulated during the system compilation process. For example, during compilation it can be determined whether a procedure 32, 34, or 36 will contain a procedure prologue 66. If a procedure 32, 34, or 36 does not include a procedure prologue 66, instructions procedure descriptor stack pointer offset and procedure descriptor entry length fields 90b and 90c are set to the flag value indicating the absence of a procedure prologue. If a procedure 32, 34 or 36 contains a procedure prologue 66, the number of instructions to be included between the start of a procedure and the stack pointer instruction 72 is determined. This value is then stored in the descriptor stack pointer offset field 90b for the procedure 34. The value to be filled in to the procedure descriptor entry length field 90c is then determined by counting the number of instructions from the start of the procedure to the first number of instructions in the instruction block 74. The procedure descriptor generation process 82 determines whether the call frame 58 or 60 to be associated with a specific procedure will be of fixed or varying size by determining if all data that the procedure 34 stores on the stack is fixed size; the process 82 then generates the appropriate type of value for the procedure type field 90a so that the field indicates the type of call frame associated with the procedure 32, 34 or 36.

As previously noted, when the application process 16 is run on the digital data processing system 10, the operating system 50 controls the execution of the procedures 32, 34 and 36 that are part of the image 46 forming the application process 16. The exception service 54 responds to exceptions that occur while the application process 16, or any other process, is running. When an exception occurs, the exception service 54 initially locates the procedure 32, 34 or 36 currently being executed by the system 10, as represented by arrow 92 (FIG. 2), and the procedure descriptor 40, 42 or 44 for the procedure, as represented by arrow 94. The exception service 54 then invokes a procedure state analyzation process 84 to determine the state of execution of the procedure, for example, procedure 36.

The procedure state analyzation process 84 determines the invocation state of a particular procedure, for example, procedure 34, by determining the portion of the procedure that was about to be executed when the exception occurred. The procedure state analyzation process 84 makes the state evaluations based on the address in the program counter 26, and the procedure descriptor values in the procedure descriptor 42 for the procedure 34. The procedure state analyzation process 84 also makes state evaluations with reference to a procedure start field 98 the process 84 has access to, as indicated by arrow 100. The procedure start field 98 contains the starting address in the memory 20 of the procedure 34 that was being executed on the system 10 when the exception occurred. The address in the procedure start field 98 are supplied by other elements of the operating system 50.

The steps by which the procedure state analyzation process 84 makes the state determinations is illustrated by the flow chart shown in FIG. 5. As depicted by block 102, the procedure state analyzation process 84 initially reads the address of the next instruction to be executed in the procedure 34 from the program counter 26, the starting address of the procedure 34 from the procedure start field 98, the procedure descriptor procedure type field 90a, the procedure descriptor stack pointer offset field 90b, and the procedure descriptor entry length field 90c. The procedure state descriptor then determines if the procedure descriptor entry length field 90c contains a flag indicating that the procedure 34 does not contain procedure prologue 66, as represented by decision block 104. If procedure 34 does not have a procedure prologue 66, the procedure state analyzer 84 proceeds to make a third state-fourth state determination.

If the procedure 34 contains procedure prologue 66, the procedure state analyzer 84 performs the following calculation:

Program Counter Address—Procedure Start Address indicated by block 106. This calculation yields the exception interrupt point, in other words, the point of execution of the procedure 34 where the exception occurred. The result of the calculation is stored in an exception interrupt point field 108 (FIG. 2) where it can be accessed by the procedure state analyzer 84, as indicated by arrow 110 so that the first and second state determinations can be made.

The procedure state analyzation process 84 then determines if the procedure was in the first state of the procedure invocation process, as depicted by decision block 112. This determination is made by comparing the exception interrupt value from the exception interrupt point field 108 with the stack pointer offset value from the procedure descriptor stack pointer offset field 90b. If the exception interrupt value is less than or equal to the stack pointer offset value, then the stack pointer instruction 72 at the end of the entry prologue 68 had not yet been executed when the exception occurred. In other words, when the exception occurred, the central processing unit 14 was still processing the entry prologue 68 and the contents of the stack pointer 62 had not yet been changed. If this is the case, the procedure state analyzation process 84 then makes a report to the exception service 54 that the procedure 34 was in the first state of the procedure invocation process as represented by block 114.

If the exception interrupt value is greater than the stack pointer offset value, the procedure state analyzation process 84 then proceeds to make a second state determination, as represented by decision block 116. The exception interrupt value is compared to the address of the first instruction in the instruction block 74 for the procedure 34, as represented by the value from the procedure descriptor entry length field 90e. If the exception interrupt value is less than the entry length value, the exception occurred after the stack pointer 62 had been changed, but before the data and instruction loading required by the caller's context save block 70 had been fully performed. In a procedure having a varying size call frame 58 or 60, this is means the exception occurred before frame pointer instruction 73 causes frame pointer 64 to be reset was executed. In procedures having a fixed size call frame 58 or 60 this means the exception occurred before the instruction that completes the saving of the callers context was executed. Thus, the exception occurred during the second state of the procedure invocation process and is so reported to the exception service 54, as represented by block 118.

The third state-fourth state determination of the procedure invocation process of the procedure 34 is made after determining that there is no procedure prologue 66, or after the second state determination. The first step in the determination is a reading of the instruction at the address contained in the program counter 26, as represented by block 120. The procedure state analyzation process 84 then determines if the procedure is in the fourth state, by determining if the instruction is a restoration sequence instruction 76, as represented by decision block 122. For a procedure with a fixed size call frame 60, the next instruction is a restoration sequence instruction 76 if it is a return instruction 80. For a procedure with a varying size call frame 60, the instruction is considered a restoration sequence instruction 76 if it is part of a sequence of restore stack pointer instruction 78 followed by a return instruction 80.

If the next instruction is a restoration sequence instruction 76, then the system 10 had completed execution of the called procedure 34 and was in the process of returning to execute the calling procedure 32 when the exception occurred. In other words, the system 10 was in the fourth state of the procedure invocation process for the called procedure 34 when the exception occurred. The procedure state analyzation process 84 then proceeds to make a fourth state report to the exception service, as represented by block 124.

If the procedure was not in the fourth state of execution, the procedure state analyzation process 84 then makes a default determination that the procedure 34 was in the third state of the procedure invocation process. The procedure state analyzation process 84 then makes a third state report to the exception service 54, as represented by block 126.

The exception service 54 uses the state report 114, 118, 124 or 126 from the procedure state analyzation process 84 to determine which exception handler to invoke for the exception. When the procedure state analyzation process 84 reports that the exception occurred during the first, second or fourth states of the invocation process called procedure 34, the exception service 54 processes the exception as if occurring during execution of the calling procedure 32. When the procedure state analyzation process 84 reports that the exception occurred during the third state of invocation process for the called procedure 34, the exception service 54 processes the exception as occurring during the execution of the called procedure 34. The exception service 54 then accesses the procedure descriptor 42 for procedure 34 so as to obtain the address of the appropriate exception handler to be invoked. If the exception service 54 determines it is appropriate to process the exception as occurring during the calling procedure 32, the procedure descriptor 40 for that procedure is accessed by the exception service 54 so as to obtain the address of the appropriate exception handler to be invoked.

If the exception occurred during the second state of execution of the called procedure 34, the exception service 54 may invoke a stack pointer restoration procedure, not illustrated, to insure that the contents of the stack pointer 56 are rewritten to include the proper stack address for the calling procedure 32. This insures that each set of instructions and data that are preserved while the exception is resolved are the true instructions and data associated with the procedure 32 being executed when the exception occurred.

Moreover, the specific process by which the exception service determines the return address of the calling procedure 32 may depend on the invocation state of the called procedure 34. If the exception occurred during the first or second invocation states, the exception service 54 will determine the return address of the calling procedure by reference to the contents of the general register 24 identified in the procedure descriptor passed address field 90d. If the exception occurred during the third or fourth invocation states, the exception service 54 will determine the return address of the calling procedure 32 by reference to the call frame 58 location identified in the procedure descriptor stored return address field 90g.

The procedure state descriptor system 12 of this invention is capable of generating procedure state reports at any time that describe the invocation state of any procedure 32, 34 or 36 that is being executed by the digital data processing system 10. Thus, when an exception occurs and the execution of a particular procedure 32, 34 or 36 must be interrupted, the procedure state descriptor system 12 makes it possible to know how far along in the execution of the procedure the digital data processing system 10 was, so that the exception service 54 can either resolve the procedure with respect to the procedure being executed, or the procedure that called the procedure being executed. Thus, the exception service 54 can immediately respond to any exception occurring during the running of the digital data processing system 10 since the exception service can, at any moment during the execution of a procedure 32, 34 or 36, be informed of the state of execution of the procedure. This eliminates error associated with exception services 54 that are unable to respond to exceptions that occur until a particular called procedure is fully invoked and being executed. Moreover, since there is no error or delay associated in the handling of exceptions, there is essentially no possibility that the exception service 54 can cause the digital data processing system 10 to lose either the current data or the instructions that are being processed by the system.

Still another advantage of the procedure state descriptor system 12 is that the system 12 operates independently of the language of the source code file 28 that was the source of the procedures 32, 34 and 36. All that is necessary is to provide a procedure descriptor generation process 82 for producing the necessary procedure descriptors 40, 42 and 44. Regardless of the source code language that the procedures 32, 34 or 36 originated from, the procedure state analyzation process 84 can then access the procedure descriptors 40, 42 and 44 to determine the state of execution of the procedures as the exceptions occur.

Alternative embodiments of the procedure state descriptor system 12 are, of course, possible. The actual states of procedure invocation and steps comprising the processes of the procedure state descriptor system 12 may vary from what has been described. For instance, the procedure descriptor generator 82 process does not necessarily have to be associated with the compiler 30 and may, for instance, be associated with a linker, or loader or other process that is part of the operating system 50 whereby the procedure descriptors 40, 42 and 44 are formed and loaded into the memory 20 as part of the formation of the image 46. Alternatively, procedure descriptor generator 82 may be part of another application process 16 that generates procedures 32, 34 and 36. The state determinations performed by the procedure state analyzation process 84 may not be totally performed by the exception service 54 but may be a distinct process that is part of the operating system 50 and that is accessed by other portions of the operating system including the exception service 54.

The locations of the offset values that distinguish between the procedure invocation states may be similarly different than those described above. For instance, other embodiments of the invention may have more or less offset values to describe a fewer or larger number of states in invocation process. Thus, in some embodiments of the invention, the first and second states of the procedure execution of the described invention may be a single state. In other embodiments of the invention, there may be an additional state indicating that only the selected general registers 22 have been loaded with the new information required by a particular called procedure.

In still other embodiments of the invention, if the structure of the particular procedures 32, 34 and 36 which are formed prior to their execution on the system 10 varies from the described version, the contents of the procedure descriptor fields 90 and the state determinations made by the procedure state analyzer 84 may similarly vary. Other instructions besides, or in addition to, the restore frame pointer instruction 77, the restore stack pointer instruction 78 or the return instruction 80 may be a part of the restoration sequence instructions 76 that mark the fourth or final state of the execution for the procedures. Accordingly, for each of these differences, the procedure descriptor fields generated by the procedure descriptor generator 82, and the subsequent read and decision steps performed by the procedure state analyzation process 84 must be appropriately modified.

Moreover, it should also be noted that for some digital data processing systems 10, the third state-fourth state determination may not be needed. If the digital data processing system 10 can restore the value of the stack pointer 62, the frame pointer 64 and the program counter 26 to that required by the calling procedure in a single, atomic step, there may be no restoration, or fourth, state of the procedure invocation process. This eliminates the need to have the procedure state analyzation process 84 perform the third state-fourth state determination sequence. There is also no need to have the procedure state analyzation process 84 perform the third state-fourth state determination sequence for procedures with fixed size call frames 58 that are executed on systems 10 that can restore the stack pointer 62 and the program counter 26 alone in a single, atomic step. Accordingly, for such a digital data processing system 10, the analysis performed by the procedure state analyzer 84 is arranged so that the third state-fourth state determination is only performed for procedures 32, 34 and 36 with varying size call frames 60. For example, the depicted process of FIG. 5 could be modified by placing a fixed call frame-varying call frame decision block 128, shown in phantom, before the read instruction in program counter block 120. If the procedure has a fixed call frame, as indicated by the contents of the procedure descriptor procedure type field 90a, then the procedure inherently is in the third state of execution, and the procedure state analyzer 84 makes the appropriate report. If the procedure has a variable sized call frame 58, then the procedure state analyzer 84 goes through the third state-fourth state determination sequence.

Similarly, the sequence described relative to FIG. 5 may be altered in various ways. For example, in an alternative embodiment, the procedure state analyzation process 84 may first read all necessary data to make each and every state determination before making a single state determination. In another embodiment of the invention, the procedure state analyzation process 84 may only read the necessary data for each state determination, immediately prior to that state determination. Further, the steps described in FIG. 5 can be executed in a different sequence to make the same state determinations. Therefore, it is intended that all matter contained in the above description or shown in the accompanying drawings be interpreted as illustrative and not in a limiting sense. Thus, it is the object of the appended claims to cover all such modifications and variations that come within the true spirit and scope of the invention.

The embodiments of the invention in which an exclusive property or privilege is claimed are defined as follows:

1. A method of procedure state reporting for use in a digital data processing system of the type including an input-output unit for entry of data and program instructions, an addressable memory for storage of data and program instructions, and a central processing unit for accessing program instructions and data from the addressable memory and for execution of program instructions, said digital data processing system being programmable for executing a set of program instructions that consists of procedures, each procedure being invoked by the central processing unit in response to one or more of the program instructions, each procedure having at least two potential invocation states and including a set of program instructions, said at least two invocation states being separately present after invocation of a procedure is initiated by the central processing unit with an invoked procedure being in a particular one of said at least two invocation states when a selected set of instructions is executed by the system, said method reporting the invocation state of a procedure invoked for execution by the digital data processing system, said method comprising (a) a procedure descriptor generator process for controlling the digital data processing system, said procedure descriptor generator process for generating a procedure descriptor for each procedure that is to be invoked for execution by the digital data processing system, said procedure descriptor including at least one procedure descriptor offset value representative of a point of execution of the procedure, each said point of execution representing a boundary between two invocation states of the procedure; and (b) a procedure state analyzation process implementable by the digital data processing system, said procedure state analyzation process including the steps of determining the portion of the invoked procedure that has been executed by the digital data processing system, comparing the portion of the invoked procedure that has been executed by the digital data processing system to one of said procedure descriptor offset values, accessing the next program instruction to be executed in said invoked procedure, reviewing said next program instruction to determine if said next program instructions is from said selected set of instructions, reporting the invocation state of the invoked procedure as a first one of said at least two invocation states if said next program instruction is not from said selected set of instructions, and reporting the invocation state of the invoked procedure as a second one of said at least two invocation states if said next program instruction is from said selected set of instructions.

2. A method of procedure state reporting for use in a digital data processing system of the type including an input-output unit for entry of data and program instructions, an addressable memory for storage of data and program instructions, and a central processing unit for accessing program instructions and data from the addressable memory and for execution of program instructions, said digital data processing system being programmable for executing a set of program instructions that consists of procedures, each procedure being invoked by the central processing unit in response to one or more of the program instructions, each procedure having at least three potential invocation states and including a set of program instructions, said at least three invocation states being separately present after invocation of a procedure is initiated by the central processing unit, with the invoked procedure being in an identifiable invocation state when a selected set of instructions is executed by the system, said method reporting the invocation state of a procedure invoked for execution by the digital data processing system, said method comprising (a) a procedure descriptor generator process for controlling the digital data processing system, said procedure descriptor generator process for generating a procedure descriptor for each procedure that is to be invoked for execution by the digital data processing system, said procedure descriptor including at least two procedure descriptor offset values, each said procedure descriptor offset value being representative of a point of execution of the procedure, each said point of execution representing a separate boundary between invocation states of the procedure; and (b) a procedure state analyzation process implementable by the digital data processing system, said procedure state analyzation process including the steps of determining the portion of the invoked procedure that has been executed by the digital data processing system, comparing the portion of the invoked procedure that has been executed by the digital data processing system to one of said procedure descriptor offset values to determine whether the procedure being invoked is in a first invocation state, and in the event the procedure being invoked is not in said first invocation state, comparing the portion of the invoked procedure that has been executed to the second one of said procedure descriptor offset values to determine whether the procedure being invoked is in a second invocation state and, in the further event the procedure being invoked is not in said second invocation state, making an additional state determination by accessing the next instruction to be executed, and determining whether said next instruction is from said selected set of instructions.

3. A method of procedure state reporting for use in a digital data processing system of the type including an input-output unit for entry of data and program instructions, an addressable memory for storage of data and program instructions, and a central processing unit for accessing program instructions and data from the addressable memory and for execution of program instructions, said digital data processing system being programmable for executing a set of program instructions that consists of procedures, each procedure being stored in the addressable memory with each part of a procedure being stored in sequential, ascending address locations in the addressable memory, each procedure being invoked by the central processing unit in response to one or more of the program instructions, each procedure having at least two potential invocation states and including at least one program instruction, said at least two invocation states being separately present after invocation of a procedure is initiated by the central processing unit, said method reporting the invocation state of a procedure invoked for execution by the digital data processing system, said method comprising (a) a procedure descriptor generator process for controlling the digital data processing system, said procedure descriptor generator process for generating a procedure descriptor for each procedure that is to be invoked for execution by the digital data processing system, said procedure descriptor including at least one procedure descriptor offset value representative of the location of a specific part of the associated procedure relative to the start of the procedure, each said point of execution representing a boundary between two invocation states of the procedure; and (b) a procedure state analyzation process implementable by the digital data processing system, said procedure state analyzation process including the steps of determining the portion of the invoked procedure that has been executed by the digital data processing system, comparing the portion of the invoked procedure that has been executed by the digital data processing system to one of said procedure descriptor offset values to determine the invocation state of the invoked procedure, and reporting the invocation state of the invoked procedure, said step of determining the portion of the invoked procedure that has been executed including the substeps of determining a starting memory address for the invoked procedure, determining the memory address for the next part of the invoked procedure to be executed and determining the portion of the invoked procedure that has been executed by determining the difference between the procedure starting memory address and the memory address of the next invoked procedure part.

4. A method of procedure state reporting for use in a digital data processing system of the type including an input-output unit for entry of data and program instructions, an addressable memory for storage of data and program instructions, and a central processing unit for accessing program instructions and data from the addressable memory and for execution of program instructions, said digital data processing system being programmable for executing a set of program instructions that consists of procedures, each procedure being invoked by the central processing unit in response to one or more of the program instructions, each procedure having at least two potential invocation states and including at least one program instruction, said at least two invocation states being separately present after invocation of a procedure is initiated by the central processing unit, said method reporting the invocation state of a procedure invoked for execution by the digital data processing system, said method comprising (a) a procedure descriptor generator process for controlling the digital data processing system, said procedure descriptor generator process for generating a procedure descriptor for each procedure that is to be invoked for execution by the digital data processing system, said procedure descriptor including at least one procedure descriptor offset value representative of a point of execution of the procedure, each said point of execution representing a boundary between two invocation states of the procedure, said procedure descriptor generator process also determining whether a particular invocation state will be absent from the procedure when the procedure is executed, and if a particular invocation state will be absent, generating a flag value for one of said procedure descriptor offset values; and (b) a procedure state analyzation process implementable by the digital data processing system, said procedure state analyzation process including the step of making a state determination based on whether said procedure descriptor offset value is set to said flag value; said procedure state analyzation process further includes the steps of determining the portion of the invoked procedure that has been executed by the digital data processing system, comparing the portion of the invoked procedure that has been executed by the digital data processing system to one of said procedure descriptor offset values to determine the invocation state of the invoked procedure, and reporting the invocation state of the invoked procedure.

5. A method of procedure state reporting for use in a digital data processing system of the type including an input-output unit for entry of data and program instructions, an addressable memory for storage of data and program instructions, and a central processing unit for accessing program instructions and data from the addressable memory and for execution of program instructions, said digital data processing system being programmable for executing a set of program instructions that consists of procedures, each procedure being stored in the addressable memory with each part of a procedure being stored in sequential, ascending address locations in the memory, each said procedure potentially including a procedure prologue comprising an entry prologue with a stack pointer modify instruction at the end thereof, and a caller's context save block, the procedure prologue being followed in the procedure by an instruction block, the instruction block having at the end thereof zero, one, or more sets of restoration sequence instructions, each said procedure being invoked by the central processing unit in response to one or more of the program instructions, each procedure having at least two potential invocation states and including at least one program instruction, said at least two invocation states being separately present after invocation of a procedure is initiated by the central processing unit, said method reporting the invocation state of a procedure invoked for execution by the digital data processing system, said method comprising (a) a procedure descriptor generator process for controlling the digital data processing system, said procedure descriptor generator process for generating a procedure descriptor for each procedure that is to be invoked for execution by the digital data processing system, said procedure descriptor including at least one procedure descriptor offset value representative of the location of a specific part of the associated procedure relative to the start of the procedure, each said point of execution representing a boundary between two invocation states of the procedure, said procedure descriptor generating process for each said procedure that has a procedure prologue including the steps of: determining the location of said stack pointer modify instruction relative to the start of the procedure and supplying said location of said stack pointer as a first procedure descriptor offset value; and, determining the location of a first instruction in said instruction block relative to the start of the procedure and supplying said location of said first instruction as a second procedure descriptor offset value; and (b) a procedure state analyzation process implementable by the digital data processing system, said procedure state analyzation process including the steps of determining the portion of the invoked procedure that has been executed by the digital data processing system, comparing the portion of the invoked procedure that has been executed by the digital data processing system to at least one of said procedure descriptor offset values to determine the invocation state of the invoked procedure, and reporting the invocation state of the invoked procedure said procedure state analyzation process including the following additional steps for each procedure that has a procedure prologue:

determining said portion of the invoked procedure that has been executed by determining a starting memory address for the invoked procedure, determining a memory address for the next part of the invoked procedure to be executed and determining the difference between said procedure starting memory address and said memory address of the next procedure part;

comparing the portion of the invoked procedure that has been executed by the digital data processing system to at least one of said procedure descriptor offset values by the steps of comparing said portion of the invoked procedure that has been executed to said first procedure descriptor offset value to determine if said stack pointer modify instruction has been executed and if said stack pointer modify instruction has not been executed, reporting that the invoked procedure is in a first invocation state;

if said stack pointer modify instruction has been executed, comparing said portion of the invoked procedure executed to said second procedure descriptor offset value to determine if said instruction block first instruction has not been executed; and if said instruction block first instruction has not been executed, reporting that the invoked procedure is in a second invocation state; and if said instruction block first instruction has been executed, determining if the next part of the invoked procedure to be executed is a restoration sequence instruction, and, if so, reporting that the invoked procedure is in a fourth invocation state, and if not, reporting that the invoked procedure is in a third invocation state.

6. The method of procedure state reporting of claim 5 wherein associated with each procedure is a stack call frame of fixed or varying size; and said procedure descriptor generation process further includes the steps of: determining whether the call frame associated with the procedure will have a fixed size call frame or a variable size call frame; and, generating a procedure descriptor procedure type field indicative of whether the stack call frame associated with the procedure will be of fixed or varying size.

7. The method of procedure state reporting of claim 6 wherein each procedure having a fixed size call frame associated therewith has a first set of restoration sequence instructions and each procedure having a varying size call frame associated therewith has a second set of restoration sequence instructions; and said procedure state analyzation process determination of whether the next part of the invoked procedure to be executed is a restoration sequence instruction further includes the steps of: determining from said procedure descriptor procedure type field whether the invoked procedure has a fixed size or a varying size call frame; if said invoked procedure has a fixed size call frame, making said restoration sequence instruction determination with respect to the first set of restoration sequence instructions; and, if said invoked procedure has a varying size call frame, making said restoration sequence instruction determination with respect to the second set of restoration sequence instructions.

8. The method of procedure state reporting of claim 6 wherein prior to making said determination of whether the next procedure part to be executed is a restoration sequence instruction, said procedure state analyzation process further includes the steps of: determining from said procedure descriptor procedure type field whether the invoked procedure has a fixed size or varying size stack call frame; and if said invoked procedure has a fixed size stack call frame, reporting that the invoked procedure is in said third invocation state; and, if said invoked procedure has a variable sized stack call frame, proceeding to make said determination whether the next procedure part to be executed is a restoration sequence instruction.

9. The procedure state analyzation process of claim 4 wherein said step of determining whether said procedure descriptor offset value is set to said flag value is made prior to said comparison of the portion of the invoked procedure that has been executed to one of said procedure descriptor values.

10. The procedure state analyzation process of claim 5 wherein (a) said procedure generator process determines whether the procedure prologue will be absent from the procedure when the procedure is executed, and if the procedure prologue will be absent generating a flag value for one said particular procedure descriptor offset value; and (b) said procedure state analyzation process, prior to comparing the portion of the invoked procedure that has been executed to said first procedure descriptor offset value further includes the step of determining from said particular procedure descriptor offset value is set to said flag; if said flag value is set, proceeding to said step of determining whether the next part of the invoked procedure to be executed is a restoration sequence instruction, and if said flag value is not set, making said comparison of the portion of the procedure that has been invoked to said first procedure descriptor value.

11. A procedure state analyzation process for use in a digital data processing system of the type having an addressable memory for storing program instructions and data and having a central processor unit for accessing and executing the stored program instructions, said process for determining the invocation state of a procedure stored in the memory of said digital data processing system at times including while a procedure is in the process of being invoked for execution by the central processor unit of the digital data processing system, the procedure including a set of program instructions and having at least three invocation states that are present at times after the process for invoking the procedure is initiated, said procedure state analyzation process comprising the steps of determining the portion of the invoked procedure that has been executed by the digital data processing system; and, comparing the portion of the invoked procedure that has been executed to at least two procedure descriptor offset values for the procedure, each said procedure offset value being determined by the central processor unit prior to the time at which the procedure is invoked for execution and being representative of a separate point of execution of the procedure, each said point of execution representing a separate boundary between invocation states of the procedure, said comparison determining the invocation state of the procedure and including the steps of comparing the portion of the invoked procedure that has been executed to a first one of said procedure descriptor offset values to make a first state determination that indicates whether the invoked procedure is in a first invocation state; and, if the invoked procedure is not in said first invocation state, comparing the portion of the invoked procedure that has been executed to a second one of said procedure descriptor offset values to make a second state determination that indicates whether the invoked procedure is in a second invocation state.

12. The procedure state analyzation process of claim 11 wherein when a selected set of instructions of the invoked procedure is executed by the system the procedure is in an identifiable invocation state and wherein said process further includes the step of: making a third state determination in the event said second state determination does not indicate that the invoked procedure is in said second invocation state, said third state determination indicating whether the procedure being invoked is in said third invocation state and being made by accessing the next instruction to be executed; and, determining whether said next instruction is from said selected set of instructions.

13. The procedure state analyzation process of claim 11 wherein in the event a particular invocation state is absent from the invoked procedure, the procedure descriptor offset value for the procedure is set to a flag value, and said process further includes the step of determining whether the procedure descriptor offset value is set to the flag value.

14. The procedure state analyzation process of claim 13 wherein said determination of whether the procedure descriptor offset value contains the flag value is made prior to making said comparison of the portion of the invoked procedure that has been executed to the procedure descriptor value.

15. The procedure state analyzation process of claim 11 wherein in the event a particular invocation state is absent from the invoked procedure, a selected one of the procedure descriptor offset values for the procedure is set to a flag value, and wherein said process further includes the step of determining whether the selected procedure descriptor offset value is set to said flag value.

16. The procedure state analyzation process of claim 15 wherein said determination of whether the selected procedure descriptor offset value is set to the flag value is made prior to making said comparison of the portion of the invoked procedure that has been executed to said selected one of said procedure descriptor values.

17. The procedure state analyzation process of claim 16 wherein in the event a particular invocation state is absent from the invoked procedure, a selected one of the procedure descriptor offset values is set to a flag value; and wherein, prior to said comparison of the portion of the invoked procedure that has been executed to one of the procedure descriptor values, said process further includes the step of determining whether the selected procedure descriptor offset value is set to the flag value.

18. The procedure state analyzation process of claim 17 wherein, when a selected set of instructions in the invoked procedure is executed by the system, the procedure is in an identifiable invocation state, and in response to the result of at least one comparison of the portion of the invoked procedure that has been executed to one of the procedure descriptor offset values, said process further includes the steps of selectively making an additional invocation state determination by accessing the next instruction to be executed, and determining whether said next instruction is within said selected set of instructions.

19. A procedure state analyzation process for use in a digital data processing system of the type having an addressable memory for storing program instructions and data and having a central processor unit for accessing and executing the stored program instructions, said process for determining the invocation state of a procedure stored in the memory of said digital data processing system at times including while a procedure is in the process of being invoked for execution by the central processor unit of the digital data processing system, the procedure including a set of program instructions and having at least two invocation states that are present at times after the process for invoking the procedure is initiated, said procedure being in an identifiable invocation state when a selected set of instructions in the invoked procedure is executed by the system, said procedure state analyzation process comprising the steps of making a first state determination by determining the portion of the invoked procedure that has been executed by the digital data processing system; comparing the portion of the invoked procedure that has been executed to at least one procedure descriptor offset value for the procedure, each said procedure offset value being determined by the central processor unit prior to the time at which the procedure is invoked for execution and being representative of a point of execution of the procedure, each said point of execution representing a boundary between two invocation states of the procedure, said comparison for determining the invocation state of the procedure, said procedure state analyzation process further including the steps of making a second state determination by accessing the next procedure instruction to be executed and, determining whether the next instruction is in said selected set of instructions.

20. A procedure state analyzation process for use in a digital data processing system of the type having an addressable memory for storing program instructions and data and having a central processor unit for accessing and executing the stored program instructions, said process for determining the invocation state of a procedure stored in the memory of said digital data processing system at times including while a procedure is in the process of being invoked for execution by the central processor unit of the digital data processing system, said procedure being stored in the memory of said digital data processing system with each part of the procedure being stored in sequential address locations in the memory, the procedure including a set of program instructions and having at least two invocation states that are present at times after the process for invoking the procedure is initiated, said procedure state analyzation process comprising the steps of determining the portion of the invoked procedure that has been executed by the digital data processing system; and, comparing the portion of the invoked procedure that has been executed to at least one procedure descriptor offset value for the procedure, each said procedure offset value being determined by the central processor unit prior to the time at which the procedure is invoked for execution and being a value representative of the location of a specific part of the procedure relative to the start of the procedure, each said point of execution representing a boundary between two invocation states of the procedure, said step of determining the portion of the invoked procedure that has been executed by the digital data processing system being performed through the steps of: determining a starting memory address of the invoked procedure; determining the memory address for the next part of the invoked procedure to be executed; and determining the difference between the starting memory address and the memory address of the next invoked procedure part with said difference being representative of said portion of the invoked procedure that has been executed; said comparison of said portion of said procedure that has been executed with said at least one procedure descriptor offset value determining the invocation state of the procedure.

* * * * *